US006169333B1

(12) United States Patent
Pentland et al.

(10) Patent No.: US 6,169,333 B1
(45) Date of Patent: Jan. 2, 2001

(54) STARTER MOTOR DRIVE STOP

(75) Inventors: Alex Moses Pentland, Ann Arbor; Daryl Alan Wilson, Ypsilanti, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 08/944,274

(22) Filed: Oct. 6, 1997

(51) Int. Cl.$^{7}$ ................................ F02N 11/00; H02P 9/04

(52) U.S. Cl. ..................... 290/38 R; 290/1 C; 290/38 A; 290/38 B; 290/38 C; 74/7 R

(58) Field of Search ................................. 290/1 C, 38 R, 290/38 B, 38 C; 74/6, 7 A, 7 C, 7 R

(56) References Cited

U.S. PATENT DOCUMENTS

| | | | | |
|---|---|---|---|---|
| 3,982,415 | * | 9/1976 | Killop | 72/88 |
| 4,395,923 | * | 8/1983 | Giometti | 74/7 R |
| 4,900,945 | * | 2/1990 | Isozumi et al. | 290/48 |
| 4,902,905 | * | 2/1990 | Morishita | 290/48 |
| 5,044,212 | * | 9/1991 | Isozumi et al. | 74/7 A |
| 5,050,441 | * | 9/1991 | Giometti | 74/7 C |
| 5,105,670 | * | 4/1992 | Isozumi et al. | 74/6 |
| 5,129,271 | * | 7/1992 | Isozumi et al. | 74/7 R |
| 5,370,009 | | 12/1994 | Isozumi . | |
| 5,848,551 | * | 12/1998 | Ohmi et al. | 74/7 C |

FOREIGN PATENT DOCUMENTS

| | | |
|---|---|---|
| 0494681A1 | 7/1992 | (EP) . |
| 0 562 475 A1 | 9/1993 | (EP) . |
| 0 732 498 A1 | 3/1996 | (EP) . |
| 2 270 954 | 11/1993 | (GB) . |
| 55-96362 | 7/1980 | (JP) . |

* cited by examiner

*Primary Examiner*—Elvin Enad
(74) *Attorney, Agent, or Firm*—Rhonda L. McCoy-Pfau

(57) ABSTRACT

In one embodiment of the present invention, a method for forming a starter motor drive stop includes the steps of forming a splined portion in a starter motor output shaft and forming at least one stop surface. Preferably, the stop surfaces are located in the splined portion and are formed as an integral part of the spline forming step.

7 Claims, 2 Drawing Sheets

STARTER MOTOR DRIVE STOP

BACKGROUND OF THE INVENTION

1. Field of the Invention

The present invention relates generally to starter motor assemblies, and more particularly to drive stops for starter motors.

2. Description of the Related Art

In typical designs for starter motor assemblies for motor vehicle engines, an output shaft is coupled to be driven by the armature of the starter motor. This output shaft typically has external splines which interact with internal splines on a starter motor "drive" assembly. A pinion gear is affixed to the drive assembly for rotation therewith. The splines on the output shaft and on the drive assembly cooperate to transmit rotational power from the starter motor to the pinion gear. The splines also act to facilitate translation of the pinion gear into mesh with a ring gear of the engine being cranked by the starter motor.

Overtranslation of the drive assembly, and therefore of the pinion gear, must be avoided. In some designs, an outboard pinion stop surface is provided, against which the pinion gear abuts to prevent overtranslation. In other designs, a stop is provided on the output shaft, slightly outboard of the splines. The stop is located so that the splines of the spline tube abut against the stop once the maximum intended translation of the drive assembly (and therefore the pinion gear) has been reached. U.S. Pat. No. 5,370,009, issued to Isozumi, discloses such a drive stop, designated therein as reference numeral 10.

Locating the stop on the output shaft has the distinct advantage of reducing the axial length of the starter motor assembly when compared to designs with an outboard stop against which the pinion gear abuts. However, as presently practiced in the art, designs with a stop on the output shaft have some disadvantages of their own. First, such a stop adds length to the output shaft beyond that necessary for the splines. This added length translates into added overall length for the starter motor assembly. Reduced package size is an ever-present requirement in the design of motor vehicle components; added length for a starter motor assembly is therefore disadvantageous. Second, as presently practiced in the art, a drive stop on the output shaft outboard of the splines requires one or more added manufacturing steps beyond the process of rolling the splines. The added manufacturing steps add cost to the manufacture of the output shaft.

Therefore, a drive stop design for a starter motor assembly which can reduce the added length and added cost required for prior-art drive stops will provided advantages over the prior art.

SUMMARY OF THE INVENTION

The present invention provides a method for forming a starter motor drive stop. The method includes forming a splined portion on a starter motor output shaft, the splined portion comprising alternating grooves and ridges. The method also comprises forming at least one stop surface as an integral part of the spline forming step.

The present invention also provides a second method for forming a starter motor drive stop. The method comprises forming a splined portion in a starter motor output shaft, the splined portion comprising alternating grooves and ridges and having a first axial end and a second axial end. Additionally, the method includes forming at least one stop surface between the first axial end and the second axial end of the splined portion.

Further, the present invention provides a starter motor output shaft. The output shaft includes a splined portion comprising a plurality of alternating ridges and grooves disposed about a circumference of the output shaft, the splined portion having a first axial end and a second axial end. In addition, the output shaft comprises a plurality of stop surfaces, each stop surface disposed between the first axial end and the second axial end of the splined portion.

Designs and manufacturing processes according to the present invention can result in reduced cost and reduced length of starter motor assemblies. In doing so, the present invention provides considerable advantage over the prior art.

DETAILED DESCRIPTION OF THE PREFERRED EMBODIMENT

Figure 1:
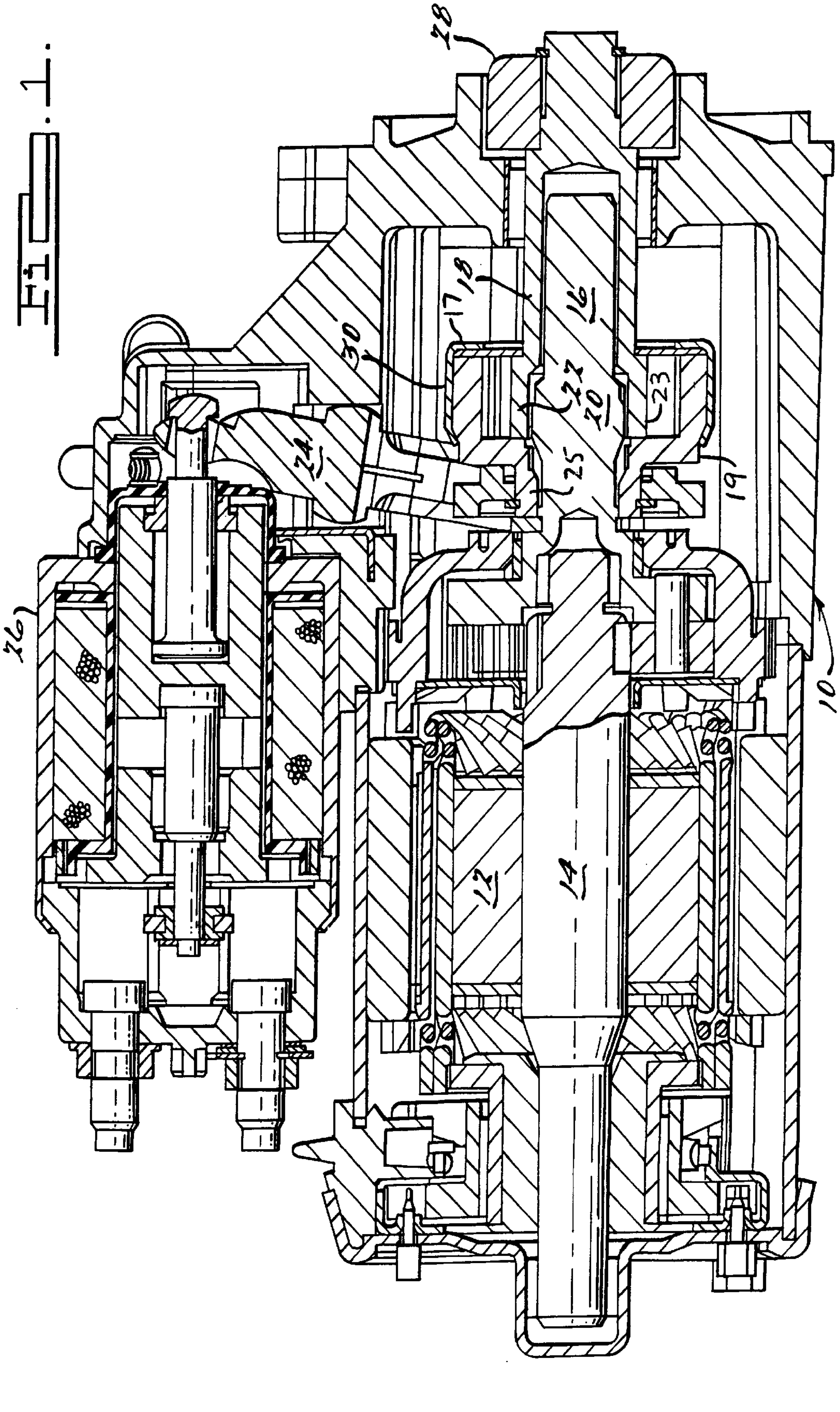
FIG. 1 is a cross-sectional view of a starter motor assembly 10 according to one embodiment of the present invention.

Refer first to FIG. 1. Illustrated there is a starter motor assembly 10 for a motor vehicle. Starter motor assembly 10 includes a motor having an armature 12 mounted about a motor shaft 14. Coupled through appropriate gearing to motor shaft 14 for rotation therewith is an output shaft 16. Mounted on output shaft 16 is a drive assembly 17. Drive assembly 17 includes a pinion extension tube 18 and a barrel 19. An overrunning clutch assembly 30 is formed by clutch inner portion 22 (a portion of pinion extension tube 18) and clutch outer portion 23 (a portion of barrel 19), with suitable rollers disposed therebetween. Barrel 19 also includes an interior-splined portion 25. An exterior-splined portion 20 on output shaft 16 interacts with interior-splined portion 25 of barrel 19 to allow axial translation of drive assembly 17 (and therefore pinion gear 28) with respect to output shaft 16. Such translation occurs under the influence of lever 24, which is coupled to solenoid 26. Pinion gear 28 is coupled to pinion extension tube 18 for rotation therewith, to transmit rotation from armature 12 to a ring gear (not shown) on a motor vehicle engine.

Figure 2:
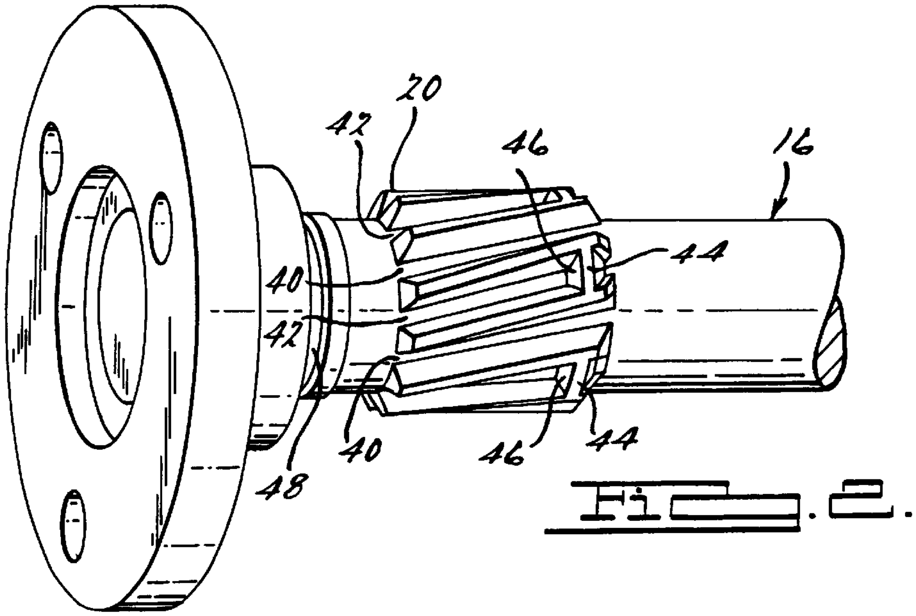
FIG. 2 illustrates output shaft 16 of starter motor assembly 10.

Refer additionally now to FIG. 2. Those skilled in the art recognize that means must be provided for preventing overtranslation of pinion gear 28 to the right as viewed in FIG. 1. Splined portion 20 of output shaft 16 includes alternating channels, such as channel 40, which proceed unobstructed through splined portion 20. Such channels alternate with channels, such as channels 42, which are interrupted by a stop portion 44. Stop portions 44 each have a stop surface 46 which, once drive assembly 17 is assembled onto output shaft 16, prevents overtranslation of spline tube 18 to the right as viewed in FIG. 1. As can be seen in FIG. 2, stop portions 44 are preferably located totally entirely within the axial extent of splined portion 20.

Unobstructed channels 40 and channels 42 containing stop portions 44 alternate to facilitate the process of assembling starter motor assembly 10. Drive assembly 17 is inserted from the right as seen in FIG. 1 over output shaft 16.

Splines 25 of drive assembly 17 are aligned with unobstructed channels 40 to allow drive assembly 17 to slide over output shaft 16. Once the splines of drive assembly 17 are to the left of the splines of output shaft 16, drive assembly 17 is rotated so that the splines of drive assembly 17 are now aligned with channels 42. Stop surfaces 46 will now prevent drive assembly 17 (and therefore pinion gear 28) from overtranslating to the right. A snap ring is placed in groove 48 of output shaft 16 to prevent drive assembly 17 from moving far enough to the left to allow the splines of drive assembly 17 to become disengaged from the splines of output shaft 16.

Figure 3:
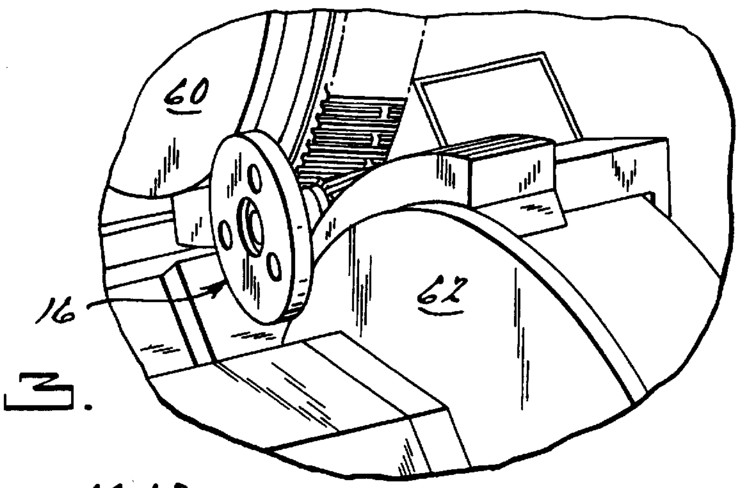
FIG. 3 illustrates a rolling process preferably used to form splined portion 20 of output shaft 16.

Preferably, splined portion 20, including stop portions 44, are formed by a rolling process. Refer additionally to FIG. 3. There, output shaft 16 is shown positioned between two rolling wheels 60 and 62 which, when rotated, form splined portion 20.

Figure 4:
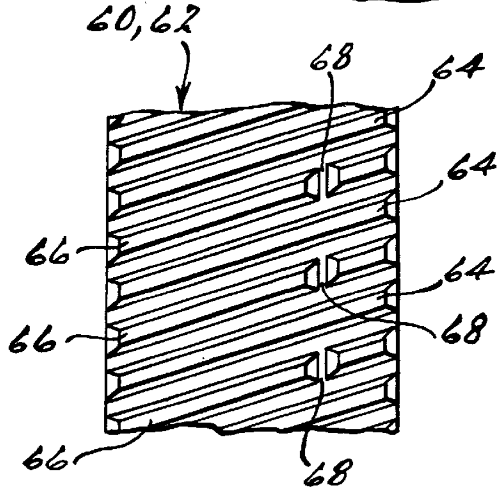
FIG. 4 shows a portion of the rolling surface of rolling wheels 60 and 62 of FIG. 3.

Refer additionally to FIG. 4. There, a portion of the rolling surface of rolling wheels 60 and 62 is illustrated. Teeth 64 form through channels 40 in splined portion 20. Teeth 66 form channels 42, with depressed portions 68 forming stop portions 44. At the portions of wheels 60 and 62 where they first begin forming splined portion 20, teeth 64 and 66 are preferably relatively short to make shallow impressions in output shaft 16. As wheels 60 and 62 proceed to rotate in forming splined portion 20, teeth 64 and 66 are taller to make deeper impressions. One can see that in this embodiment of the present invention, stop portions 44 are integral parts of output shaft 16, due to stop portions 44 being formed from the material of which output shaft 16 is comprised. That is, stop portions 44 are not formed separately and subsequently attached to output shaft 16.

A distinct advantage of forming stop portions 46 within the axial extent of splined portion 20 is that the rolling process herein described holds output shaft 16 in place without axial fixturing. This occurs because in the formation of stop portions 44 by depressions 68, balanced axial forces are applied to the two axial ends of stop portions 44. Output shaft 20 thus remains in place through the rolling process, with no axial fixturing required.

Another substantial advantage provided by the process and design described herein accrues from forming stop portions 44 and stop surfaces 46 by rolling, and particularly by rolling in an integral process with the rolling of the splines in splined portion 20. Secondary operations required to complete the pinion stop in other designs having splines and stops located in proximity therewith is thus avoided. Yet another advantage provided by locating the stop surfaces 48 within the axial extent of splined portion 20 is a reduction in length of output shaft 16, and therefore also the length of starter motor assembly 10, over the other designs.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for forming a starter motor drive stop, said method comprising the steps of:

forming a splined portion on a starter motor output shaft, said splined portion comprising alternating grooves and ridges and having a first axial end and a second axial end, said axial ends defining an axial extent of said splined portion; and forming at least one stop surface having an axial thickness at one of said first and second axial ends of each of said alternating grooves and connecting with the one of the first and second axial ends of adjacent ridges within said axial extent of said splined portion as an integral part of said spline forming step.

2. A method as recited in claim 1, wherein said spline forming step is performed by rolling.

3. A method as recited in claim 1, wherein said spline forming step and said stop surface forming step are performed simultaneously.

4. A starter motor output shaft defining an axis of rotation, said output shaft comprising:

a splined portion comprising a plurality of alternating ridges and grooves disposed about a circumference of said output shaft, said splined portion having a first axial end and a second axial end, said axial ends defining an axial extent of said splined portion;

a plurality of stop portions each having a surface having an axial thickness and disposed at one of the first and second said axial ends of each of said alternating grooves and connecting with the one of the first and second axial ends of adjacent ridges, wherein each said axial thickness of said stop surface is disposed entirely within said axial extent of said splined portion.

5. A starter motor output shaft as recited in claim 4, wherein said stop surfaces are integral parts of said output shaft.

6. A starter motor output shaft as recited in claim 5 further comprising:

a member having a splined portion engaged with said splined portion of said output shaft;

an output gear coupled for rotation with said member.

7. A starter motor output shaft as recited in claim 6, further comprising:

a motor armature;

wherein said starter motor output shaft is coupled for rotation with said motor armature.

* * * * *